United States Patent [19]
Uehara et al.

[11] Patent Number: 5,280,345
[45] Date of Patent: Jan. 18, 1994

[54] JITTER CORRECTION CIRCUIT FOR REDUCING JITTER COMPONENTS OF A LUMINANCE SIGNAL IN VIDEO INFORMATION COMPRESSION

[75] Inventors: Yasuaki Uehara, Kobe; Naoji Okumura, Osaka, both of Japan

[73] Assignee: Matsushita Electric Industrial Co., Ltd., Osaka, Japan

[21] Appl. No.: 863,269

[22] Filed: Apr. 3, 1992

[30] Foreign Application Priority Data

Apr. 4, 1991 [JP] Japan ................ 3-071530

[51] Int. Cl.$^5$ .................... H04N 9/64; H04N 5/04
[52] U.S. Cl. ...................... 358/37; 358/166; 358/158; 358/148; 358/149
[58] Field of Search ............... 358/148, 149, 158, 37, 358/166, 13, 140, 180, 133, 11, 12, 23; 375/122

[56] References Cited

U.S. PATENT DOCUMENTS

| | | | |
|---|---|---|---|
| 4,870,661 | 9/1989 | Yamada et al. | 358/13 |
| 4,908,697 | 3/1990 | Tsinberg et al. | 358/133 |
| 4,959,718 | 9/1990 | Bennett | 358/148 |
| 5,070,395 | 12/1991 | Kitaura et al. | 358/140 |
| 5,150,201 | 9/1992 | Mehrgardt et al. | 358/13 |

FOREIGN PATENT DOCUMENTS

| | | |
|---|---|---|
| 0162501 | 11/1985 | European Pat. Off. . |
| 0287174 | 10/1988 | European Pat. Off. . |
| 0379212 | 7/1990 | European Pat. Off. . |
| 0381271 | 8/1990 | European Pat. Off. . |
| 2178624 | 2/1987 | United Kingdom . |

*Primary Examiner*—James J. Groody
*Assistant Examiner*—John W. Miller
*Attorney, Agent, or Firm*—Lowe, Price, LeBlanc & Becker

[57] ABSTRACT

A jitter correction circuit includes a first device for detecting a phase difference between a horizontal sync signal in a video signal and a system clock signal locked to burst components of the video signal. A second device serves to subject a first luminance signal in the video signal to phase interpolation to convert the first luminance signal to a second luminance signal. The second luminance signal is selectively stored into a memory to compress the second luminance signal. A third device serves to shift a compressed luminance signal outputted from the memory by a period which is responsive to the phase difference detected by the first device and which is equal to or shorter than one fourth of a 1-clock period of the system clock signal.

5 Claims, 11 Drawing Sheets

JITTER CORRECTION CIRCUIT FOR REDUCING JITTER COMPONENTS OF A LUMINANCE SIGNAL IN VIDEO INFORMATION COMPRESSION

BACKGROUND OF THE INVENTION

This invention relates to a jitter correction circuit for reducing or canceling jitter components of a video signal.

Some high density television (HDTV) receivers have an aspect ratio of 16:9. On the other hand, the current standard television signals have an aspect ratio of 4:3. Also, the video signals from video cassette tape recorders (VCR) have an aspect ratio of 4:3.

When a television receiver having an aspect ratio of 16:9 is required to handle a video signal having an aspect ratio of 4:3, it is necessary to provide a ¾ compression circuit which compresses the video signal in the horizontal direction by 25%.

The video signal from a VCR is nonstandard which differs from a standard television signal. Specifically, in the nonstandard video signal, a luminance signal jitters since it is out of synchronism with a clock signal.

In the case where a standard television signal is processed by the ¾ compression circuit, the output signal from the ¾ compression circuit is generally free from jitter components. On the other hand, in the case where a nonstandard video signal is processed by the ¾ compression circuit, the output signal from the ¾ compression circuit tends to be contaminated by jitter components.

SUMMARY OF THE INVENTION

It is an object of this invention to provide a jitter correction circuit which can be used in a ¾ compression circuit.

A first aspect of this invention provides a jitter correction circuit comprising first means for detecting a phase difference between a horizontal sync signal in a video signal and a system clock signal locked to burst components of the video signal; second means for subjecting a first luminance signal in the video signal to phase interpolation to convert the first luminance signal to a second luminance signal; a memory; third means for selectively storing the second luminance signal into the memory to compress the second luminance signal; and fourth means for shifting a compressed luminance signal outputted from the memory by a period which is responsive to the phase difference detected by the first means and which is equal to or shorter than one fourth of a 1-clock period of the system clock signal.

A second aspect of this invention provides a jitter correction circuit comprising first means for detecting a phase difference between a horizontal sync signal in a video signal and a first system clock signal locked to burst components of the video signal, the first system clock signal having a frequency equal to four times a chrominance subcarrier frequency of the video signal; second means for subjecting a first luminance signal in the video signal to phase interpolation in response to a second system clock signal to convert the first luminance signal to a second luminance signal, the second system clock signal having a frequency equal to eight times the chrominance subcarrier frequency of the video signal; a memory; third means for selectively storing the second luminance signal into the memory in response to the second system clock signal to compress the second luminance signal; and fourth means for shifting a compressed luminance signal outputted from the memory by a period which is responsive to the phase difference detected by the first means and which is equal to or shorter than two fourths of a 1-clock period of the second system clock signal.

A third aspect of this invention provides a jitter correction circuit comprising first means for detecting a phase difference between a horizontal sync signal in a video signal and a first system clock signal locked to burst components of the video signal, and for generating data which represents the detected phase difference and which has an LSB to an MSB, the the first system clock signal having a frequency equal to four times a chrominance subcarrier frequency of the video signal; second means for generating a horizontal reset pulse signal in response to the horizontal sync signal; third means synchronized with the horizontal reset pulse signal for subjecting a first luminance signal in the video signal to phase interpolation in response to a second system clock signal to convert the first luminance signal to a second luminance signal, the second system clock signal having a frequency equal to eight times the chrominance subcarrier frequency of the video signal; a memory; fourth means synchronized with the horizontal reset pulse signal for selectively storing the second luminance signal into the memory in response to the second system clock signal to compress the second luminance signal; a 1-clock delay element for shifting a timing of the horizontal reset pulse signal by a period corresponding to a 1-clock period of the second system clock signal when the MSB of the phase difference data is "1"; and fifth means for shifting a compressed luminance signal outputted from the memory by a period which is responsive to the LSB to an MSB-1 of the phase difference data and which is equal to or shorter than one fourth of the 1-clock period of the second system clock signal.

A fourth aspect of this invention provides a jitter correction circuit comprising first means for detecting a phase difference between a horizontal sync signal in a video signal and a system clock signal locked to burst components of the video signal; second means for subjecting a first luminance signal in the video signal to phase interpolation to convert the first luminance signal to a second luminance signal; third means for shifting the second luminance signal by a period which is responsive to the phase difference detected by the first means and which is equal to or shorter than one fourth of a 1-clock period of the system clock signal; a memory; and fourth means for selectively storing an output signal from the third means into the memory to compress the output signal from the third means.

A fifth aspect of this invention provides a jitter correction circuit comprising first means for detecting a phase difference between a horizontal sync signal in a video signal and a system clock signal locked to burst components of the video signal; second means for shifting a first luminance signal in the video signal by a period which is responsive to the phase difference detected by the first means and which is equal to or shorter than one third of a 1-clock period of the system clock signal; third means for subjecting an output signal from the second means to phase interpolation to convert the output signal from the second means to a second luminance signal; a memory; and fourth means for selectively storing the second luminance signal into the memory to compress the second luminance signal.

DESCRIPTION OF THE BACKGROUND ART

Before the description of embodiments of this invention, a background-art ¾ compression circuit which is not prior art to this invention will be explained hereinafter for a better understanding of this invention.

Figure 1:
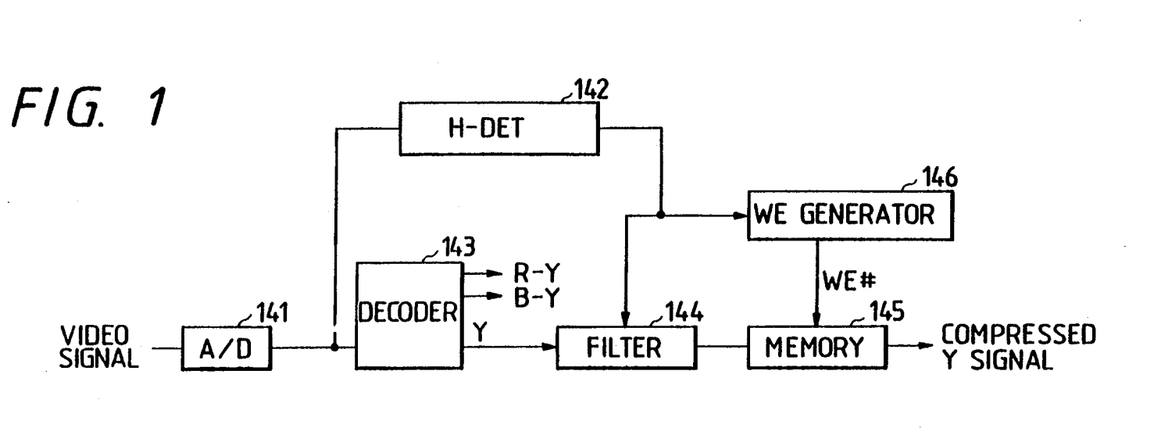
FIG. 1 is a block diagram of a background-art ¾ compression circuit.

With reference to FIG. 1, a background-art ¾ compression circuit includes an A/D converter 141, a horizontal sync signal detector 142, a composite video signal decoder 143, a composite filter 144, a memory 145, and a write enable signal generator 146.

A clock signal generator (not shown) generates a system clock signal locked to burst components of an input analog composite video signal. The A/D converter 141 converts the input analog composite video signal into a corresponding digital composite video signal in response to the clock signal fed from the clock signal generator. The A/D converter 141 feeds the digital composite video signal to the horizontal sync signal detector 142 and the composite video signal decoder 143. The horizontal sync signal detector 142 generates a horizontal reset pulse signal from horizontal sync components of the digital composite video signal. The horizontal reset pulse signal is synchronous with the clock signal. The horizontal reset pulse signal has a fixed frequency ratio (for example, 1:910) with the clock signal. The horizontal sync signal detector 142 feeds the horizontal reset pulse signal to the composite filter 144 and the write enable signal generator 146. The composite video signal decoder 143 separates the digital composite video signal into a luminance signal Y and color signals R-Y and B-Y. The composite video signal decoder 143 feeds the luminance signal Y to the composite filter 144. The composite filter 144 subjects the luminance signal Y to phase interpolation in order to allow smooth compression of the luminance signal Y.

Figure 2:
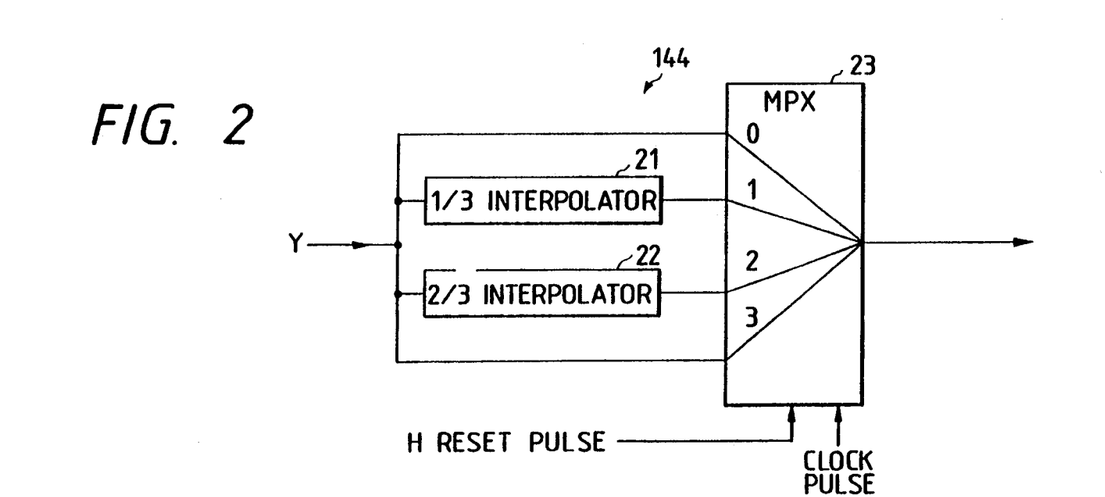
FIG. 2 is a block diagram of the composite filter of FIG. 1.

As shown in FIG. 2, the composite filter 144 includes a ⅓ clock interpolator 21, a ⅔ clock interpolator 22, and a multiplexer 23. The multiplexer 23 has four input terminals (a "0" input terminal, a "1" input terminal, a "2" input terminal, and a "3" input terminal) and a single output terminal. The luminance signal Y is directly applied to the "0" input terminal and the "3" input terminal of the multiplexer 23. The luminance signal Y is also fed to the ⅓ clock interpolator 21 and the ⅔ clock interpolator 22. The ⅓ clock interpolator 21 estimates the digital value of the luminance signal which occurs at a moment a ⅓-clock period after each moment of sampling of the luminance signal at the A/D converter 11. During this estimation, the ⅓ clock interpolator 21 uses six successive samples of the luminance signal for one estimated digital data. The ⅓ clock interpolator 21 outputs the ⅓-clock offset luminance signal to the "1" input terminal of the multiplexer 23. The ⅔ clock interpolator 22 estimates the digital value of the luminance signal which occurs at a moment a ⅔-clock period after each moment of sampling of the luminance signal at the A/D converter 11. During this estimation, the ⅔ clock interpolator 22 uses six successive samples of the luminance signal for one estimated digital data. The ⅔ clock interpolator 22 outputs the ⅔-clock offset luminance signal to the "2" input terminal of the multiplexer 23. As understood from FIG. 3, the multiplexer 23 sequentially selects and outputs one of the non-offset luminance signal, the ⅓-clock offset luminance signal, the ⅔-clock offset luminance signal, and the non-offset luminance signal in response to the clock signal. Thus, the multiplexer 23 generates a sequence of the non-offset luminance signal, the ⅓-clock offset luminance signal, the ⅔-clock offset luminance signal, and the non-offset luminance signal which is outputted from the composite filter 144. The selecting operation of the multiplexer 23 is synchronized with the horizontal reset pulse signal. The interpolators 21 and 22 offer delays of the processed signals which are generally corrected by delay compensating circuits (not shown) provided in the separated four lines connected to the respective input terminals of the multiplexer 23.

Figure 3:
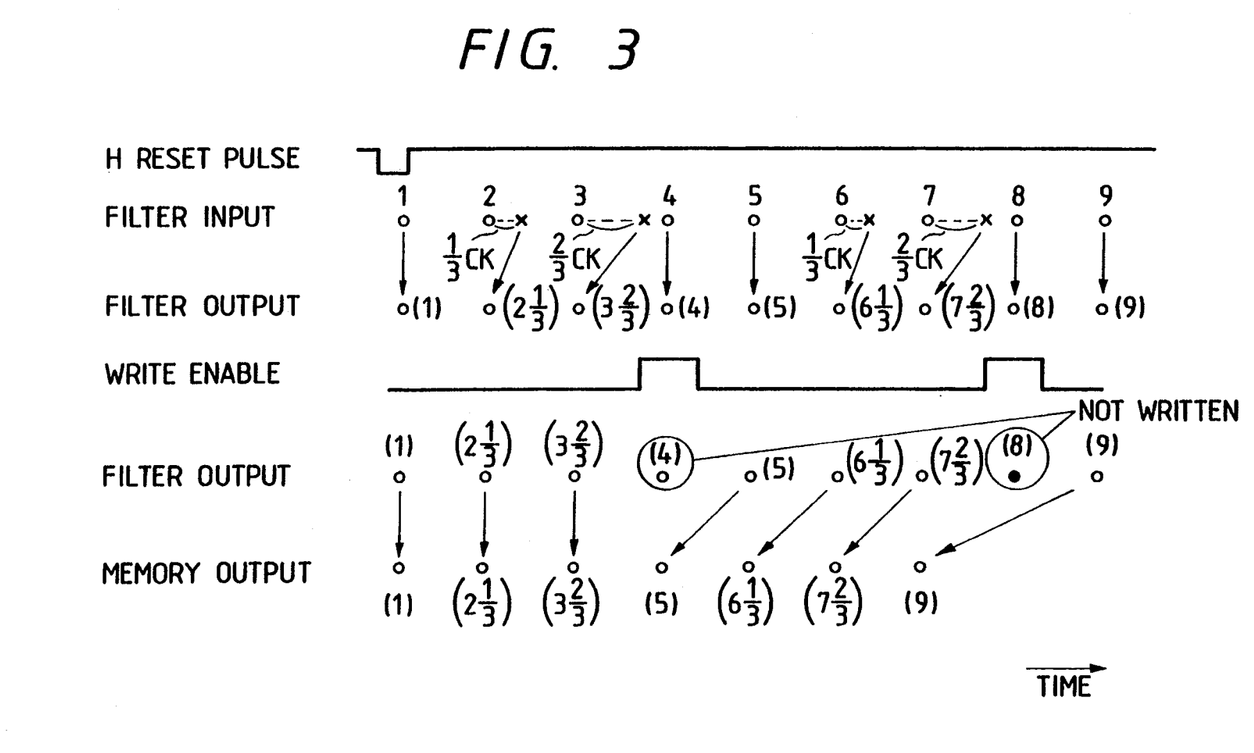
FIG. 3 is a time-domain diagram showing the relation among the phases of various signals in the background-art ¾ compression circuit of FIG. 1.

The write enable signal generator 146 generates a write enable signal WE on the basis of the horizontal reset pulse signal. As shown in FIG. 3, the write enable signal WE is in a low-level write enable state during three successive clock periods, and is in a high-level write disable state during a next clock period. Thus, the write enable signal WE has a frequency equal to ¼ of the clock signal. The write enable signal generator 146 outputs the write enable signal WE to the memory 145. The output signal from the composite filter 144 is fed to the memory 145. During the interval where the write enable signal WE is in its low-level write enable state, the output signal from the composite filter 144 is periodically written into the memory 145 in response to pulses of the clock signal. During the interval where the write enable signal WE is in its high-level write disable state, writing the output signal from the composite filter 144 into the memory 145 is inhibited. Thus, as shown in FIG. 3, three successive luminance signal data "1", "2⅓", and "3⅔" are written into the memory 145 but next luminance signal data "4" is inhibited from being written into the memory 145. This selective writing of luminance signal data into the memory 145 is periodically reiterated. In this way, the luminance signal is periodically thinned out and is compressed to ⅔, being written into the memory 145. The luminance signal data is sequentially read out from the memory 145 in response to pulses of the clock signal, so that the ⅔-compressed luminance signal including a sequence of the luminance signal data "1", "2⅓", "3⅔", "5", ... is outputted from the memory 145.

As described previously, the video signal from a VCR is nonstandard which differs from a standard television signal. Specifically, in the nonstandard video signal, a luminance signal jitters since it is out of synchronism with a clock signal. In the case where a standard television signal is processed by the background-art ⅔ compression circuit of FIG. 1, the output signal from the ⅔ compression circuit is generally free from jitter components. On the other hand, in the case where a nonstandard video signal is processed by the background-art ⅔ compression circuit of FIG. 1, the output signal from the ⅔ compression circuit tends to be contaminated by jitter components.

Figure 4:
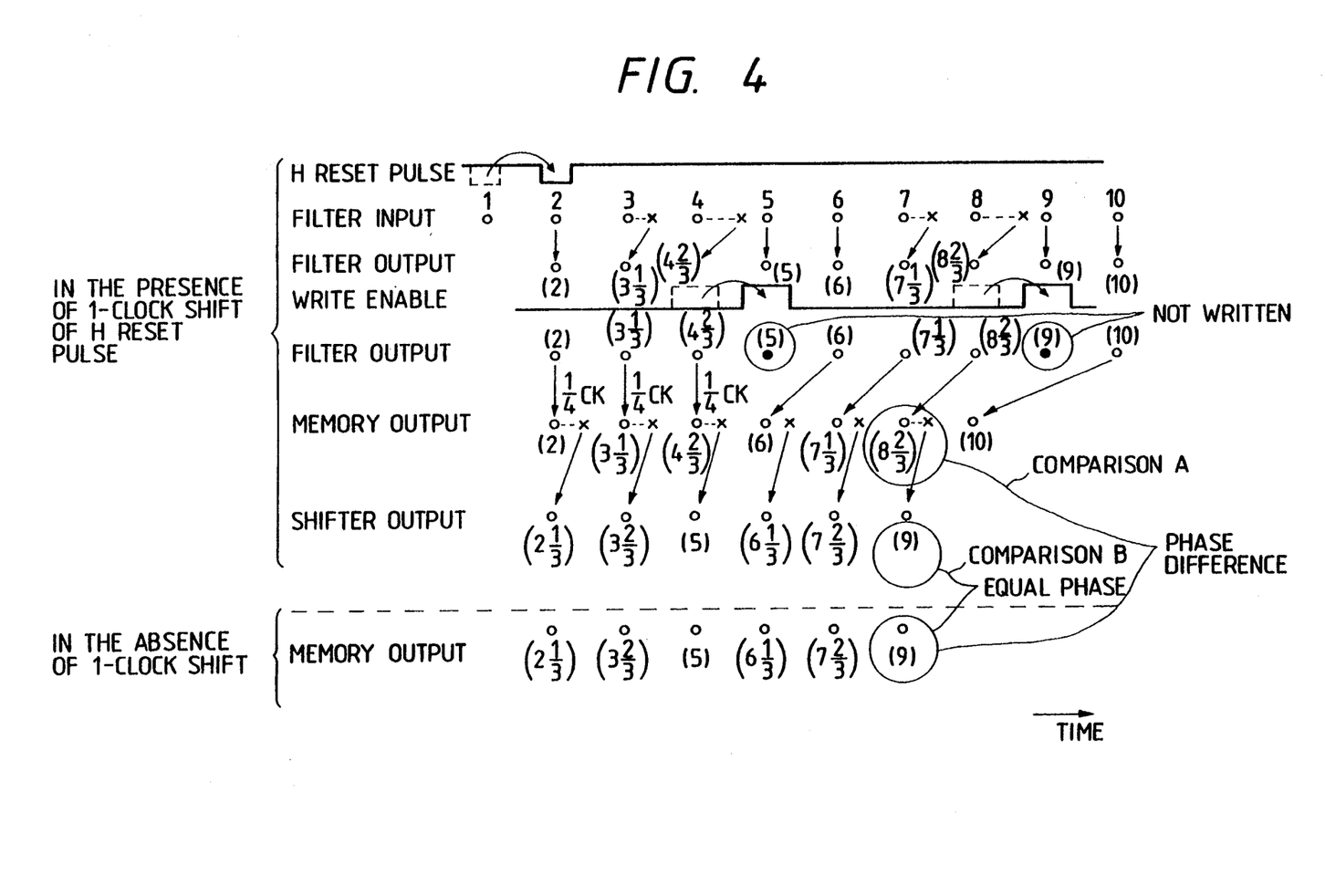
FIG. 4 is a time-domain diagram showing the relation among various signals.

It is now assumed that, during the processing of a nonstandard video signal, the horizontal reset pulse signal shifts by a period corresponding to one clock pulse as shown in FIG. 4. In this case, the composite filter 144 sequentially outputs luminance signal data "2", "3⅓", "4⅔", "5", ... as shown in FIG. 4. The three successive luminance signal data "2", "3⅓", and "4⅔" are written into the memory 145 but the next luminance signal data "5" is inhibited from being written into the memory 145. This selective data writing is periodically reiterated. In this case, the memory 145 outputs the ⅔-compressed luminance signal which includes a sequence of the luminance signal data "2", "3⅓", "4⅔", "6", ... as shown in FIG. 4. Since the output signal from the memory 145 includes a sequence of the luminance signal data "1", "2⅓", "3⅔", "5", ... in the absence of a shift of the horizontal reset pulse signal, there is a phase difference of a ⅓ clock period (one third of the clock period) between the output signal from the memory 145 which occurs in the presence of a 1-clock shift of the horizontal reset pulse signal and the output signal from the memory 145 which occurs in the absence of the shift of the horizontal reset pulse signal. This phase difference shows that jitter components remain in the output signal from the memory 145.

DESCRIPTION OF THE FIRST PREFERRED EMBODIMENT

Figure 5:
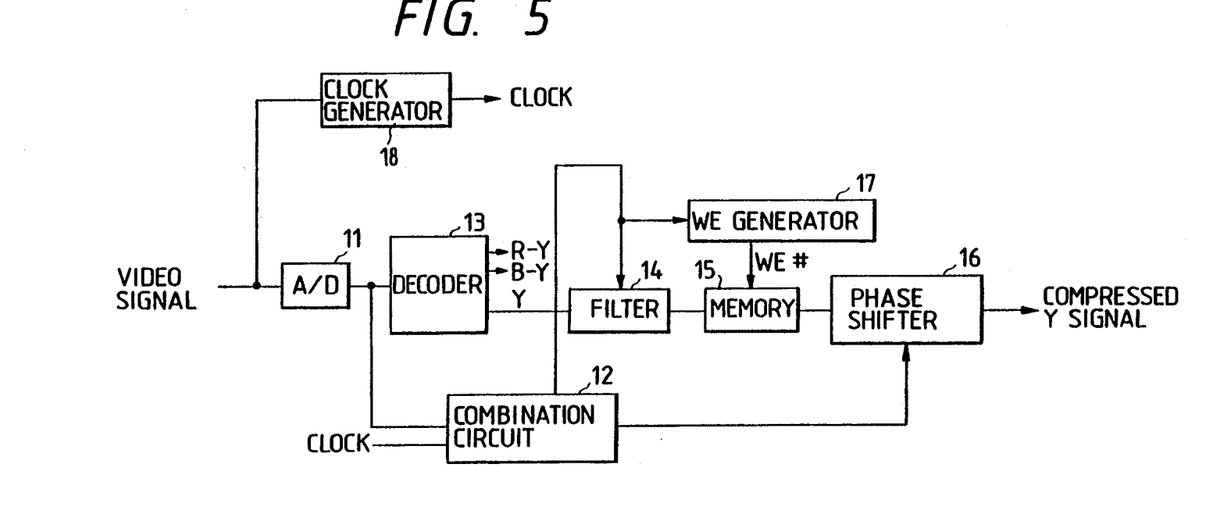
FIG. 5 is a block diagram of a ¾ compression circuit including a jitter correction circuit according to a first embodiment of this invention.

With reference to FIG. 5, a ⅔ compression circuit of a first embodiment of this invention includes an A/D converter 11, a combination circuit 12, a composite video signal decoder 13, a composite filter 14, a memory 15, a phase shifter 16, and a write enable signal generator 17. The combination circuit 12 includes a phase difference detecting section and a horizontal reset pulse generating section. The combination circuit 12 can be formed by one of commercially available LSI or IC chips such as "DPU 2553" produced by German maker, ITT.

The ⅔ compression circuit also includes a clock signal generator 18 which generates a system clock signal locked to burst components of an input analog composite video signal. The system clock signal has a frequency equal to, for example, four times the chrominance subcarrier frequency of the video signal. The clock signal generator 18 feeds the clock signal to the devices 11-17.

The A/D converter 11 converts the input analog composite video signal into a corresponding digital composite video signal in response to the clock signal fed from the clock signal generator 18. The A/D converter 11 feeds the digital composite video signal to the combination circuit 12 and the composite video signal decoder 13.

In the case of a nonstandard video signal from a VCR, color difference signals are synchronized with a clock signal, but a luminance signal is out of synchronism with the clock signal and thus the luminance signal tends to jitter. The combination circuit 12 receives the clock signal from the clock signal generator 18. The phase difference detecting section of the combination circuit 12 detects an advance of the phase of the horizontal sync components of the digital composite video signal relative to the phase of the clock signal, and outputs a signal representing information of the detected phase advance (the detected phase difference). Since the horizontal sync components form a part of the luminance signal, the phase-difference signal outputted from the combination circuit 12 represents the phase difference between the luminance signal and the clock signal. The phase-difference signal outputted from the combination circuit 12 is fed to the phase shifter 16. The horizontal reset pulse generating section of the combination circuit 12 generates a horizontal reset pulse signal in response to the horizontal sync components of the digital composite video signal. The horizontal reset pulse signal is synchronized with the clock signal. The horizontal reset pulse signal has a fixed frequency ratio (for example, 1:910) with the clock signal. The combination circuit 12 feeds the horizontal reset pulse signal to the composite filter 14 and the write enable signal generator 17.

The composite video signal decoder 13 separates the digital composite video signal into a luminance signal Y and color signals R-Y and B-Y. The composite video signal decoder 13 feeds the luminance signal Y to the composite filter 14. The composite filter 14 subjects the luminance signal Y to phase interpolation in order to allow smooth compression of the luminance signal Y. The composite filter 14 is similar in structure and operation to the composite filter 144 of FIGS. 1 and 2.

The write enable signal generator 17 generates a write enable signal WE on the basis of the horizontal reset pulse signal. The write enable signal generator 17 is similar to the write enable signal generator 146 of FIG. 1. The write enable signal generator 17 outputs the write enable signal WE to the memory 15. The output signal from the composite filter 14 is fed to the memory 15. The memory 15 is similar to the memory 145 of FIG. 1. The operation of the combination of the composite filter 14, the memory 15, and the write enable signal generator 17 is similar to the operation of the combination of the composite filter 144, the memory 145, and the write enable signal generator 146 of FIG. 1. Thus, the luminance signal is periodically thinned out and is compressed to ⅔, being written into the memory 15. In addition, the ⅔-compressed luminance signal is outputted from the memory 15. The output signal from the memory 15 is fed to the phase shifter 16.

It is now assumed that, during the processing of a nonstandard video signal, the horizontal reset pulse signal shifts by a period corresponding to one clock pulse as shown in FIG. 4. In this case, the composite filter 14 sequentially outputs luminance signal data "2", "3⅓", "4⅔", "5", ... as shown in FIG. 4. The three successive luminance signal data "2", "3⅓", and "4⅔" are written into the memory 15 but the next luminance signal data "5" is inhibited from being written into the memory 15. This selective data writing is periodically reiterated. In this case, the memory 15 outputs the ⅔-compressed luminance signal which includes a sequence of the luminance signal data "2", "3⅓", "4⅔", "6", ... as shown in FIG. 4. Since the output signal from the memory 15 includes a sequence of the luminance signal data "1", "2⅓", "3⅔", "5", ... in the absence of a shift of the horizontal reset pulse signal, there is a phase difference of a ⅓ clock period (one third of the clock period) between the output signal from the memory 15 which occurs in the presence of a 1-clock shift of the horizontal reset pulse signal and the output signal from the memory 15 which occurs in the absence of the shift of the horizontal reset pulse signal. This phase difference shows that jitter components remain in the output signal from the memory 15. The ⅓-clock phase difference is measured with respect to the non-compressed luminance signal, and thus corresponds to the ¼-clock phase difference in the ⅔-compressed luminance signal. It should be noted that ¼ equals ⅓ multiplied by ¾. Accordingly, the ¼-clock phase difference can be canceled by providing a ¼-clock phase shift to the output signal from the memory 15 as shown in FIG. 4. The phase shifter 16 serves to provide such a phase shift to the output signal from the memory 15 as shown in FIG. 4.

As described previously, in the case of a nonstandard video signal, a luminance signal is out of synchronism with the clock signal and thus tends to jitter. Jitters which occur in unit of clock pulse are removed by the combination of the composite filter 14, the memory 15, and the write enable signal generator 17 which operates in response to the horizontal reset pulse signal outputted from the combination circuit 12. Jitters which occur within a 1-clock period are reduced or removed by the phase shifter 16. As understood from the description related to FIG. 4, jitter components in the output signal from the memory 15 correspond to a period, the maximum of which equals to a ¼ clock period (one fourth of the clock period). The phase shifter 16 provides a phase shift to the output signal from the memory 15 in order to cancel jitter components of the output signal from the memory 15 in response to the phase difference detected by the combination circuit 12. Specifically, the provided phase shift is proportional to the phase difference detected by the combination circuit 12, and the maximum of the provided phase shift corresponds to a ¼ clock period (one fourth of the clock period). The phase shifter 16 outputs the ⅔-compressed luminance signal which is essentially free from jitter components.

Figure 6:
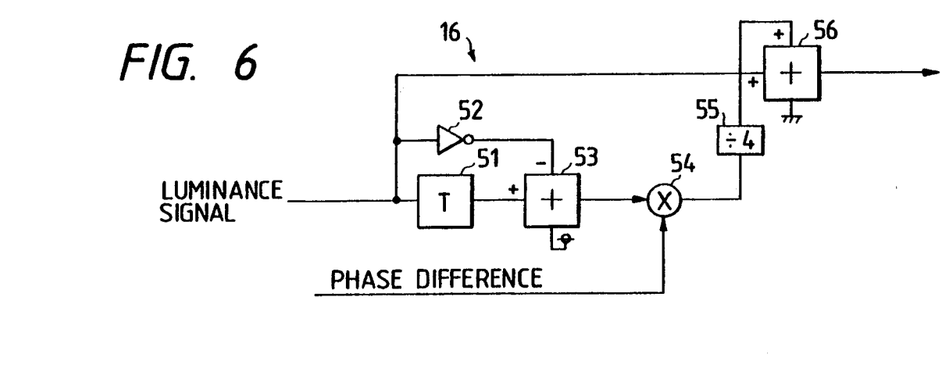
FIG. 6 is a block diagram of the phase shifter of FIG. 5.

As shown in FIG. 6, the phase shifter 16 includes a delay element 51, an inverter 52, a subtracter 53, a multiplier 54, a divider 55, and an adder 56. The compressed luminance signal outputted from the memory 15 is applied to the delay element 51, the inverter 52, and the adder 56. The delay element 51 delays the compressed luminance signal by a period corresponding to one clock pulse. The output signal from the delay element 51 is applied to the subtracter 53. The inverter 52 inverts the compressed luminance signal. The output signal from the inverter 52 is applied to the subtracter 53. The subtracter 53 subtracts the output signal of the inverter 52 from the output signal of the delay element 51. The subtracter 53 detects the difference between two data of the luminance signal which occur at moments spaced by a 1-clock period. Thus, the subtracter 53 generates information representing a phase opposite to the phase of jitter components. The subtracter 53 outputs the luminance-signal difference to the multiplier 54. The multiplier 54 receives the phase-difference signal from the combination circuit 12. The multiplier 54 multiplies the luminance-signal difference and the phase-difference, generating difference data corresponding to the jitter components in the un-compressed luminance signal. The phase-difference signal fed from the combination circuit 12 represents a variable in the range of 0 to 1. The phase-difference signal being equal to 0 corresponds to the fact that the luminance signal is accurately synchronized with the clock signal. The multiplier 54 outputs the difference data to the divider 55. The divider 55 divides the difference data by 4, generating corrected difference data which corresponds to the jitter components in the compressed luminance signal. The divider 55 outputs the corrected difference data to the adder 56. The adder 56 adds the compressed luminance signal and the corrected difference data, canceling the jitter components in the compressed luminance signal and generating the jitter-free compressed luminance signal. The adder 56 outputs the jitter-free compressed luminance signal.

DESCRIPTION OF THE SECOND PREFERRED EMBODIMENT

Figure 7:
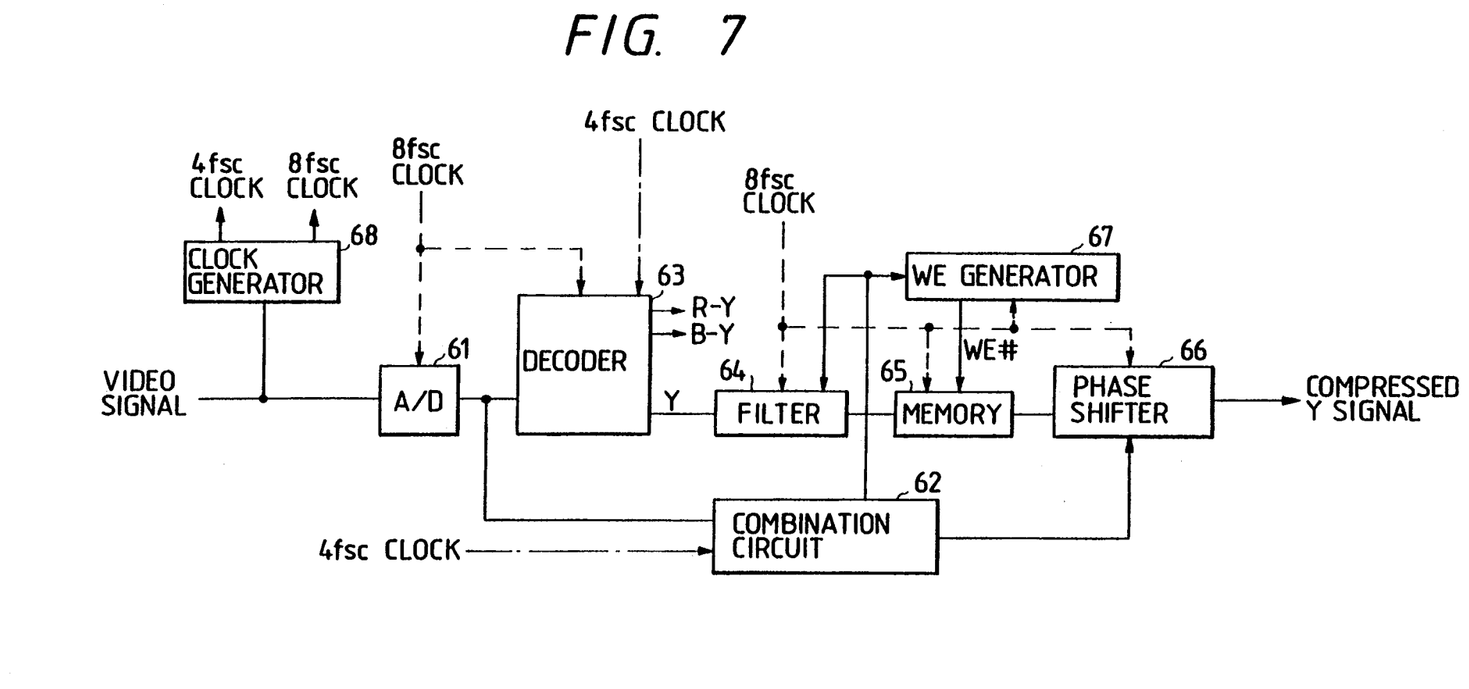
FIG. 7 is a block diagram of a ¾ compression circuit including a jitter correction circuit according to a second embodiment of this invention.

FIG. 7 shows a second embodiment of this invention which is similar to the embodiment of FIG. 5 except for design changes indicated later. As shown in FIG. 7, a ⅔ compression circuit of a second embodiment of this invention includes an A/D converter 61, a combination circuit 62, a composite video signal decoder 63, a composite filter 64, a memory 65, a phase shifter 66, and a write enable signal generator 67.

The ⅔ compression circuit also includes a clock signal generator 68 having first and second sections. The first section of the clock signal generator 68 generates a first system clock signal locked to burst components of an input analog composite video signal. The first system clock signal has a frequency "4 fsc" equal to four times the chrominance subcarrier frequency "fsc" of the video signal. The clock signal generator 68 feeds the 4 fsc clock signal to the devices 62 and 63. The second section of the clock signal generator 68 generates a second system clock signal locked to the burst components of the input analog composite video signal. The second system clock signal has a frequency "8 fsc" equal to eight times the chrominance subcarrier frequency "fsc" of the video signal. The clock signal generator 68 feeds the 8 fsc clock signal to the devices 61, 63, 64, 65, 66, and 67. The feed of the 8fsc clock signal to the devices 61, 63, 64, 65, 66, and 67 enables a higher speed of operation of the devices 61, 63, 64, 65, 66, and 67.

Jitter components within a 1-clock period correspond to a phase shift, the maximum of which corresponds to a period equal to one fourth of the period of the 4 fsc clock signal used by the combination circuit 62. Thus, the maximum of the jitter phase shift corresponds to two fourths of the period of the 8 fsc clock signal. In view of this fact, the phase shifter 66 is designed so as to provide a phase shift, the maximum of which corresponds to two fourths of the period of the 8 fsc clock signal. Specifically, the phase shifter 66 provides a phase shift to the output signal from the memory 65 in response to the phase difference detected by the combination circuit 62. In addition, the provided phase shift is proportional to the phase difference detected by the combination circuit 62. The phase shifter 66 outputs the ¾-compressed luminance signal which is essentially free from jitter components.

Figure 8:
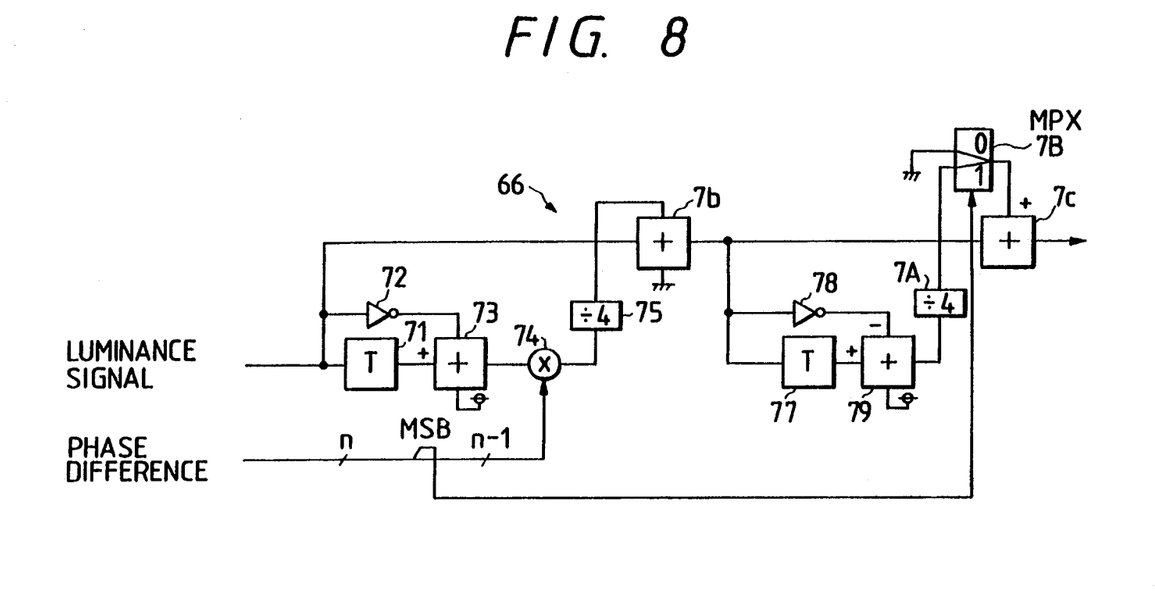
FIG. 8 is a block diagram of the phase shifter of FIG. 7.

As shown in FIG. 8, the phase shifter 66 includes a delay element 71, an inverter 72, a subtracter 73, a multiplier 74, a divider 75, an adder 76, a delay element 77, an inverter 78, a subtracter 79, a divider 7A, a multiplexer 7B, and an adder 7C. The compressed luminance signal outputted from the memory 65 is applied to the delay element 71, the inverter 72, and the adder 76. The delay element 71 delays the compressed luminance signal by a period corresponding to one clock pulse. The output signal from the delay element 71 is applied to the subtracter 73. The inverter 72 inverts the compressed luminance signal. The output signal from the inverter 72 is applied to the subtracter 73. The subtracter 73 subtracts the output signal of the inverter 72 from the output signal of the delay element 71. The subtracter 73 detects the difference between two data of the luminance signal which occur at moments spaced by a 1-clock period. Thus, the subtracter 73 generates information representing a phase opposite to the phase of jitter components. The subtracter 73 outputs the luminance-signal difference to the multiplier 74. The multiplier 74 receives the LSB to the MSB-1 of the phase-difference signal from the combination circuit 62. The multiplier 74 multiplies the luminance-signal difference and the LSB to the MSB-1 data of the phase difference, generating difference data corresponding to at least portions of the jitter components in the un-compressed luminance signal. The phase-difference signal fed from the combination circuit 62 represents a variable in the range of 0 to 1. The phase-difference signal being equal to 0 corresponds to the fact that the luminance signal is accurately synchronized with the clock signal. The multiplier 74 outputs the difference data to the divider 75. The divider 75 divides the difference data by 4, generating corrected difference data which corresponds to at least portions of the jitter components in the compressed luminance signal. The divider 75 outputs the corrected difference data to the adder 76. The adder 76 adds the compressed luminance signal and the corrected difference data, canceling portions of the jitter components, which correspond to phase shifts up to one fourth of the clock period, in the compressed luminance signal. The luminance signal outputted from the memory adder 76 is applied to the delay element 77, the inverter 78, and the adder 7C. The delay element 77 delays the received luminance signal by a period corresponding to one clock pulse. The output signal from the delay element 77 is applied to the subtracter 79. The inverter 78 inverts the received luminance signal. The output signal from the inverter 78 is applied to the subtracter 79. The subtracter 79 subtracts the output signal of the inverter 78 from the output signal of the delay element 77. The subtracter 79 detects the difference between two data of the luminance signal which occur at moments spaced by a 1-clock period. Thus, the subtracter 79 generates information representing a phase opposite to the phase of jitter components. The subtracter 79 outputs the luminance-signal difference to the divider 7A. The divider 7A divides the luminance-difference data by 4, generating corrected luminance-difference data. The divider 7A outputs the corrected luminance-difference data to the multiplexer 7B. The multiplexer 7B receives a digital signal representing "0". The multiplexer 7B is controlled by the MSB of the phase-difference signal outputted from the combination circuit 62. When the MSB of the phase-difference signal is "0", the multiplexer 7B selects the signal "0" and feeds the signal "0" to the adder 7C. In this case, the adder 7C adds the signal "0" and the output signal from the adder 76, outputting a luminance signal which is equal to the output signal from the adder 76. When the MSB of the phase-difference signal is "1", the multiplexer 7B selects the corrected luminance-difference signal and feeds the corrected luminance-difference signal to the adder 7C. In this case, the adder 7C adds the corrected luminance-difference signal and the output signal from the adder 76, canceling the remaining jitter components, which correspond to phase shifts up to further one fourth of the clock period, in the output signal from the adder 76. Thus, the adder 7C cancels the remaining jitter components in the compressed luminance signal, and generates and outputs the jitter-free compressed luminance signal. The output signal from the adder 7C is used as an output signal from the phase shifter 66. In this way, when the MSB of the phase-difference data is "0", the phase shifter 66 executes the cancel of jitters corresponding to a period up to one fourth of the clock period. When the MSB of the phase-difference data is "1", the phase shifter 66 executes the cancel of jitters corresponding to a period up to two fourths of the clock period.

DESCRIPTION OF THE THIRD PREFERRED EMBODIMENT

Figure 9:
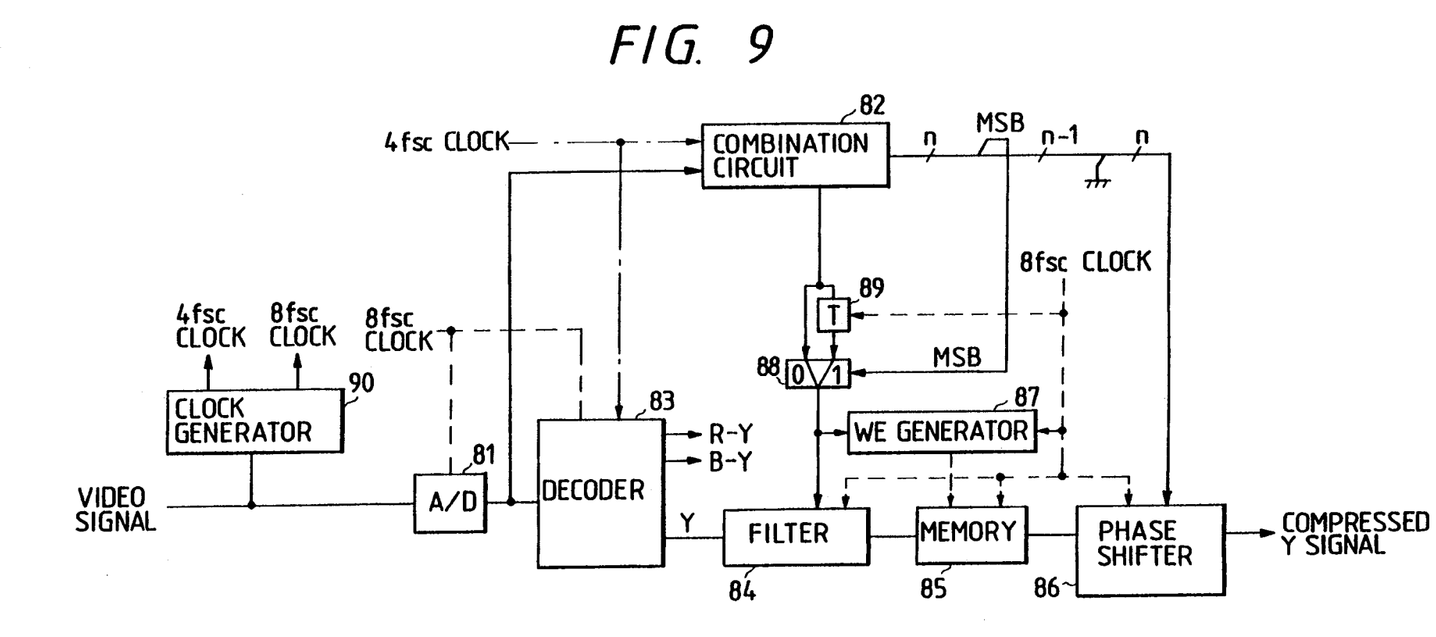
FIG. 9 is a block diagram of a ¾ compression circuit including a jitter correction circuit according to a third embodiment of this invention.

FIG. 9 shows a third embodiment of this invention which is similar to the embodiment of FIG. 5 except for design changes indicated later. As shown in FIG. 9, a ¾ compression circuit of a third embodiment of this invention includes an A/D converter 81, a combination circuit 82, a composite video signal decoder 83, a composite filter 84, a memory 85, a phase shifter 86, a write enable signal generator 87, a multiplexer 88, and a delay element 89.

The ¾ compression circuit also includes a clock signal generator 90 having first and second sections. The first section of the clock signal generator 90 generates a first system clock signal locked to burst components of an input analog composite video signal. The first system clock signal has a frequency "4 fsc" equal to four times the chrominance subcarrier frequency "fsc" of the video signal. The clock signal generator 90 feeds the 4 fsc clock signal to the devices 82 and 83. The second section of the clock signal generator 90 generates a second system clock signal locked to the burst components of the input analog composite video signal. The second system clock signal has a frequency "8 fsc" equal to eight times the chrominance subcarrier frequency "fsc" of the video signal. The clock signal generator 90 feeds the 8 fsc clock signal to the devices 81, 83, 84, 85, 86, 87, and 89. The feed of the 8 fsc clock signal to the devices 81, 83, 84, 85, 86, 87, and 89 enables a higher speed of operation of the devices 81, 83, 84, 85, 86, 87, and 89.

The combination circuit 82 outputs a horizontal reset pulse signal to the multiplexer 88 and the delay element 89. The delay element 89 delays the horizontal reset pulse signal by a period corresponding to one pulse of the 8 fsc clock signal. The delay element 89 outputs the delayed horizontal reset pulse signal to the multiplexer 88. The multiplexer 88 selects one of the non-delayed horizontal reset pulse signal and the delayed horizontal reset pulse signal in response to the MSB of phase-difference data outputted from the combination circuit 82. The multiplexer 88 feeds the selected horizontal reset pulse signal to the composite filter 84 and the write enable signal generator 87.

Jitter components within a 1-clock period correspond to a phase shift, the maximum of which corresponds to a period equal to one fourth of the period of the 4 fsc clock signal used by the combination circuit 82. Thus, the maximum of the jitter phase shift corresponds to two fourth of the period of the 8 fsc clock signal.

When the horizontal reset pulse signal fed from the combination circuit 82 to the composite filter 84 and the write enable signal generator 87 is shifted by a period corresponding to one pulse of the 8 fsc clock signal, the phase of the compressed luminance signal outputted from the memory 85 is shifted by a period corresponding to one fourth of the 8 fsc clock period. In view of this fact, the multiplexer 88 and the delay element 89 are provided to cancel portions of jitter components. The remaining jitter components are canceled by the phase shifter 86. The phase shifter 86 provides a phase shift of the output signal from the memory 85 in response to the LSB to the MSB-1 of the phase-difference information outputted from the combination circuit 82. The phase shift provided by the phase shifter 86 is proportional to the detected phase difference represented by the LSB to the MSB-1 of the output signal from the combination circuit 82. The maximum of the phase shift provided by the phase shifter 86 corresponds to one fourth of the period of the 8 fsc clock signal.

Specifically, in the case where the MSB of the phase-difference data outputted from the combination circuit 82 is "1", that is, in the case where the detected phase difference exceeds 50% of the maximal phase difference, the multiplexer 88 selects the delayed horizontal reset pulse signal and feeds the delayed horizontal reset pulse signal to the composite filter 84 and the write enable signal generator 87. As a result, the correction of jitter components corresponding to one fourth of the period of the 8 fsc clock signal is executed. In other words, the original jitter components corresponding to periods up to two fourths of the period of the 8 fsc clock signal are reduced to jitter components corresponding to periods up to one fourth of the period of the 8 fsc clock signal. The remaining jitter components are canceled by the phase shifter 86.

DESCRIPTION OF THE FOURTH PREFERRED EMBODIMENT

Figure 10:
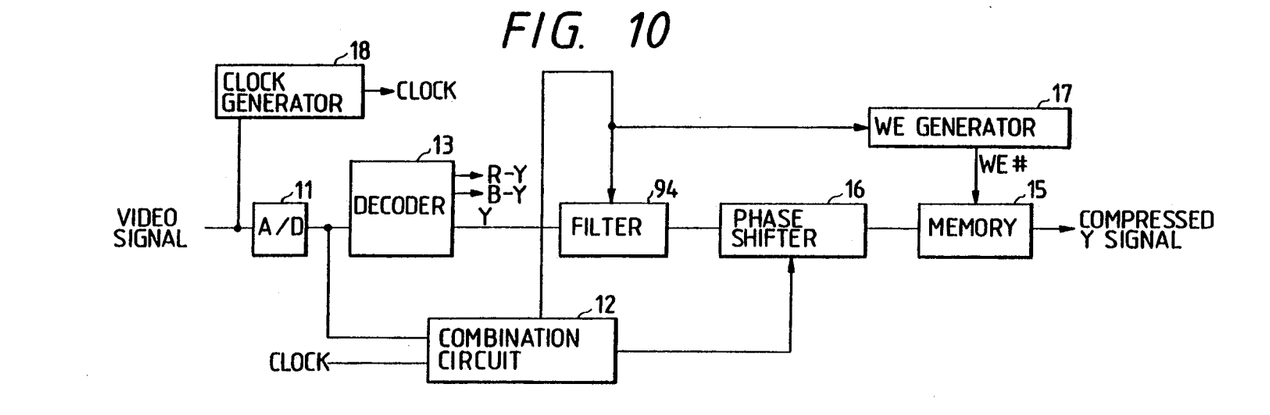
FIG. 10 is a block diagram of a ¾ compression circuit including a jitter correction circuit according to a fourth embodiment of this invention.

FIG. 10 shows a fourth embodiment of this invention which is similar to the embodiment of FIG. 5 except for design changes indicated later. As shown in FIG. 10, a ⅜ compression circuit of a fourth embodiment of this invention includes an A/D converter 11, a combination circuit 12, a composite video signal decoder 13, a composite filter 94, a memory 15, a phase shifter 16, and a write enable signal generator 17. The embodiment of FIG. 10 uses the composite filter 94 in place of the composite filter 14 of FIG. 5. In the embodiment of FIG. 10, the phase shifter 16 is connected between the composite filter 94 and the memory 15.

The ⅜ compression circuit also includes a clock signal generator 18 which feeds a clock signal to the devices 11, 12, 13, 15, 16, 17, and 94.

The output signal from the composite filter 94 is applied to the phase shifter 16. The phase shifter 16 provides a phase shift to the output signal from composite filter 94 in response to the phase difference detected by the combination circuit 12. Specifically, the provided phase shift is proportional to the phase difference detected by the combination circuit 12, and the maximum of the provided phase shift corresponds to a ¼ clock period (one fourth of the clock period). The phase shifter 16 serves to cancel jitter components in the output signal from the composite filter 94.

The output signal from the phase shifter 16 is applied to the memory 15, and is periodically and selectively written into the memory 15. The selective data writing into the memory 15 results in ⅜ compression of the luminance signal. The luminance signal data is sequentially read out from the memory 15, being outputted as a ⅜-compressed luminance signal.

Figure 11:
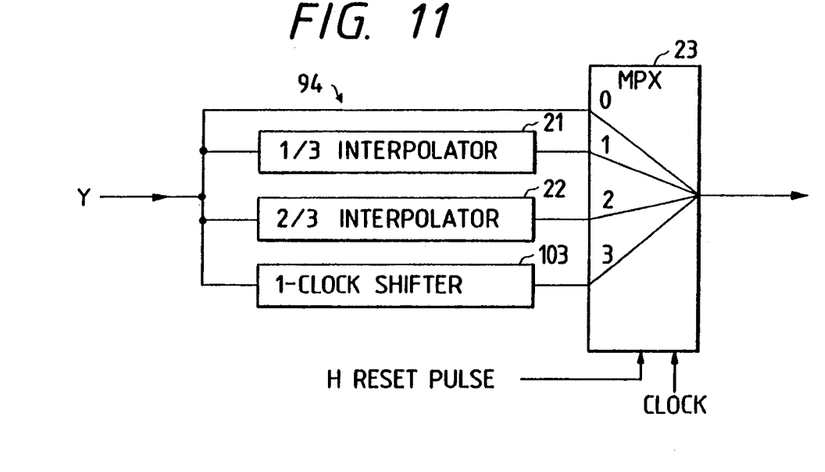
FIG. 11 is a block diagram of the composite filter of FIG. 10.

As shown in FIG. 11, the composite filter 94 includes a ¼ clock interpolator 21, a ⅜ clock interpolator 22, a multiplexer 23, and a 1-clock shifter 103. The multiplexer 23 has four input terminals (a "0" input terminal, a "1" input terminal, a "2" input terminal, and a "3" input terminal) and a single output terminal. The luminance signal Y is directly applied to the "0" input terminal of the multiplexer 23. The luminance signal Y is also fed to the ¼ clock interpolator 21, the ⅜ clock interpolator 22, and the 1-clock shifter 103. The ¼ clock interpolator 21 estimates the digital value of the luminance signal which occurs at a moment a ¼-clock period after each moment of sampling of the luminance signal at the A/D converter 11. During this estimation, the ¼ clock interpolator 21 uses six successive samples of the luminance signal for one estimated digital data. The ¼ clock interpolator 21 outputs the ¼-clock offset luminance signal to the "1" input terminal of the multiplexer 23. The ⅜ clock interpolator 22 estimates the digital value of the luminance signal which occurs at a moment a ⅜ clock period after each moment of sampling of the luminance signal at the A/D converter 11. During this estimation, the ⅜ clock interpolator 22 uses six successive samples of the luminance signal for one estimated digital data. The ⅜ clock interpolator 22 outputs the ⅜-clock offset luminance signal to the "2" input terminal of the multiplexer 23. The 1-clock shifter 103 shifts the phase of the luminance signal Y by a period corresponding to one clock pulse. The 1-clock shifter 103 outputs the 1-clock shifted luminance signal to the "3" input terminal of the multiplexer 23. As understood from FIG. 12, the multiplexer 23 sequentially selects and outputs one of the non-offset luminance signal, the ¼-clock offset luminance signal, the ⅜-clock offset luminance signal, and the 1-clock shifted luminance signal in response to the clock signal signal. Thus, the multiplexer 23 generates a sequence of the non-offset luminance signal, the ¼-clock offset luminance signal, the ⅜-clock offset luminance signal, and the 1-clock shifted luminance signal which is outputted from the composite filter 94. The selecting operation of the multiplexer 23 is synchronized with the horizontal reset pulse signal. The interpolators 21 and 22 offer delays of the processed signals which are generally corrected by delay compensating circuits (not shown) provided in the separated four lines connected to the respective input terminals of the multiplexer 23.

Figure 12:
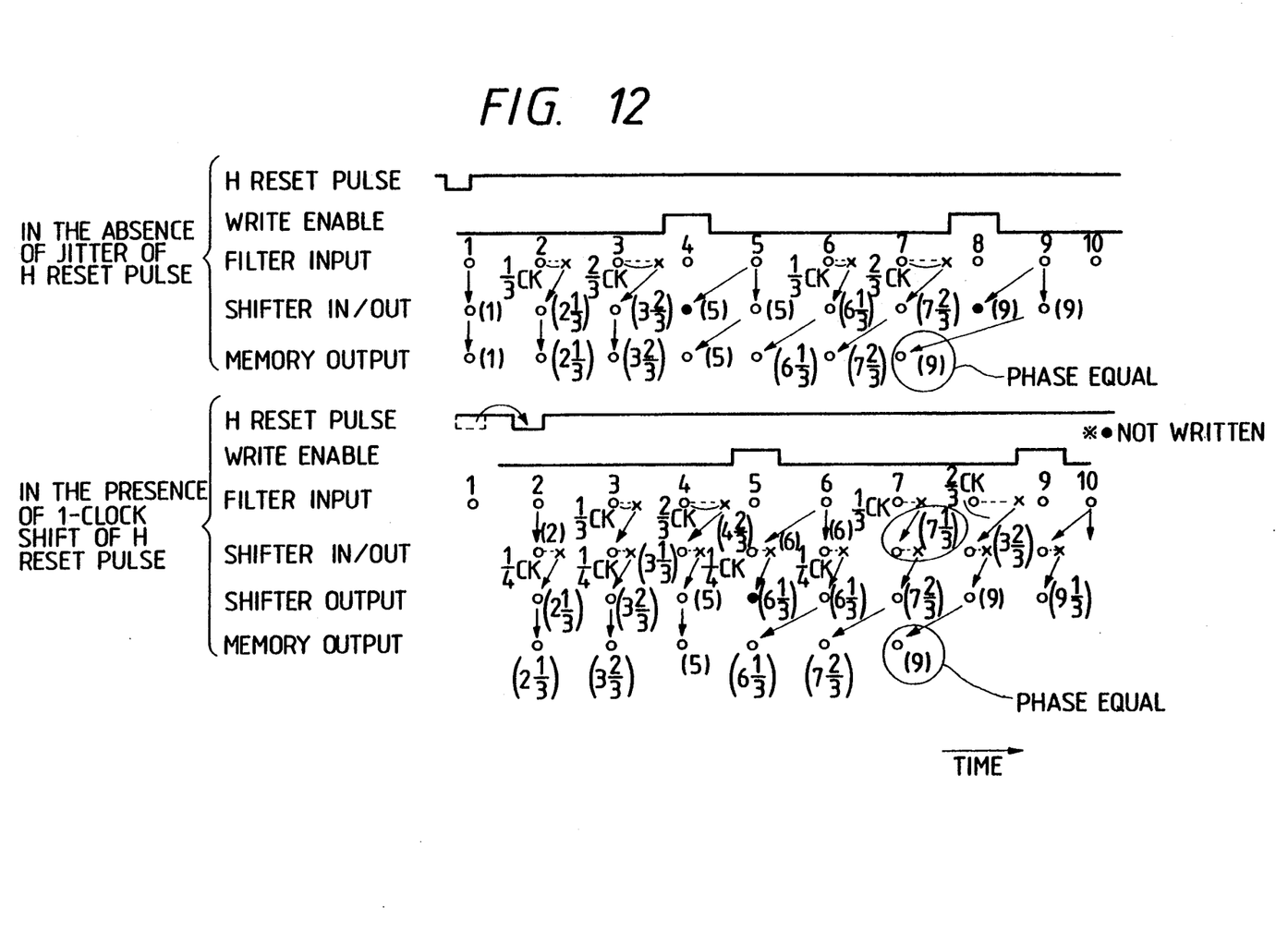
FIG. 12 is a time-domain diagram showing the relation among the phases of various signals in the ¾ compression circuit of FIG. 10.

For example, the output signal from the composite filter 94 includes a sequence of luminance signal data "1", "2⅓", "3⅔", "5", "5", "6⅓", . . . as shown in FIG. 12. In the absence of a detected jitter phase difference, the phase shifter 16 provides no phase shift to the output signal from the composite filter 94. As shown in FIG. 12, the luminance signal outputted from the phase shifter 16 is selectively and periodically written into the memory 15, so that the luminance signal is thinned out and is compressed to ¾. The memory 15 outputs the ¾-compressed luminance signal which includes a sequence of the luminance signal data "1", "2⅓", "3⅔", "5", "6⅓", . . . .

It is now assumed that, during the processing of a nonstandard video signal, the horizontal reset pulse signal shifts by a period corresponding to one clock pulse as shown in FIG. 12. In this case, the composite filter 94 sequentially outputs luminance signal data "2", "3⅓", "4⅔", "6", "6", . . . as shown in FIG. 12. The phase shifter 16 provides a ⅓-clock phase shift to the output signal from the composite filter 94, outputting luminance signal data "2⅓", "3⅔", "5", "6⅓", "6", . . . as shown in FIG. 12. The three successive luminance signal data "2⅓", "3⅔", and "5" are written into the memory 15 but the next luminance signal data "6⅓" is inhibited from being written into the memory 15. This selective data writing is periodically reiterated. In this case, the memory 15 outputs the ¾-compressed luminance signal which includes a sequence of the luminance signal data "2⅓", "3⅔", "5", "6⅓", "7⅔", . . . as shown in FIG. 12.

DESCRIPTION OF THE FIFTH PREFERRED EMBODIMENT

Figure 13:
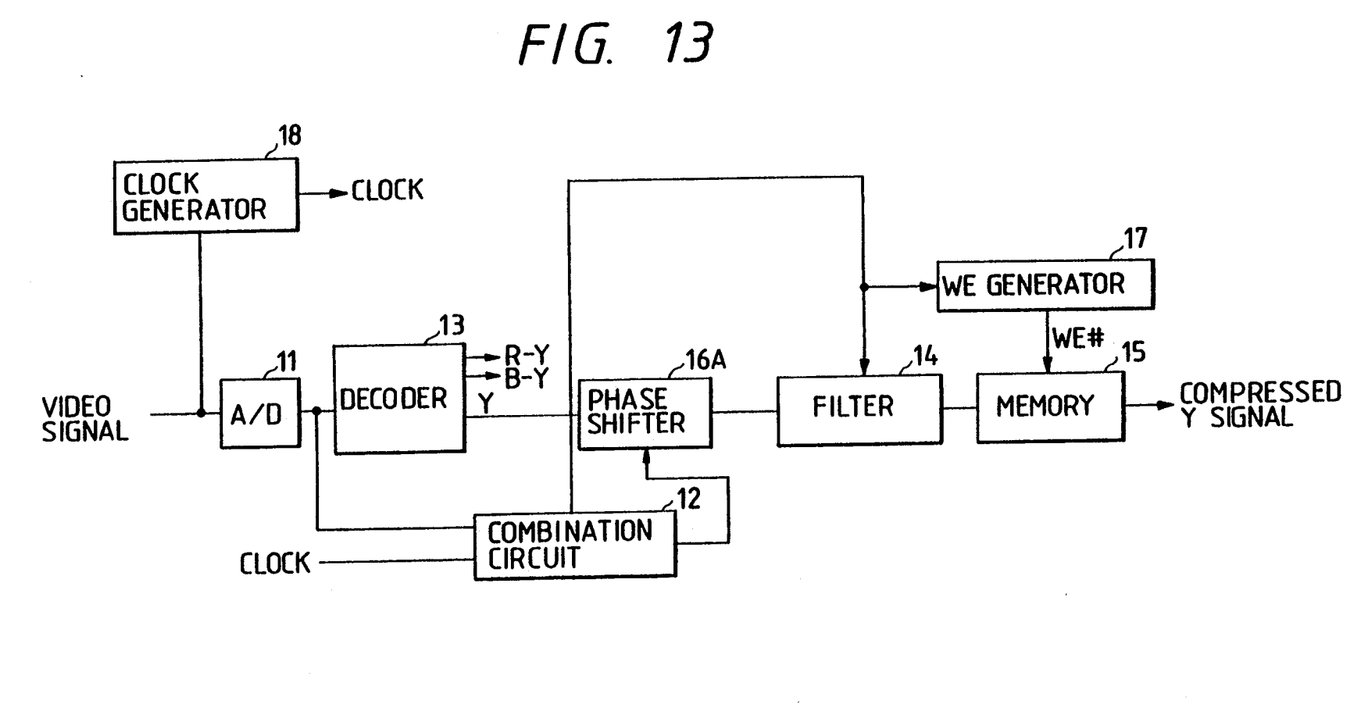
FIG. 13 is a block diagram of a ¾ compression circuit including a jitter correction circuit according to a fifth embodiment of this invention.

FIG. 13 shows a fifth embodiment of this invention which is similar to the embodiment of FIG. 5 except for design changes indicated later. As shown in FIG. 13, a ¾ compression circuit of a fifth embodiment of this invention includes an A/D converter 11, a combination circuit 12, a composite video signal decoder 13, a composite filter 14, a memory 15, a phase shifter 16A, and a write enable signal generator 17. The embodiment of FIG. 13 uses the phase shifter 16A in place of the phase shifter 16 of FIG. 5. In the embodiment of FIG. 13, the phase shifter 16A is connected between the composite video signal decoder 13 and the composite filter 14.

The ¾ compression circuit also includes a clock signal generator 18 which feeds a clock signal to the devices 11, 12, 13, 14, 15, 16A, and 17.

The luminance signal Y outputted from the composite video signal decoder 13 is applied to the phase shifter 16A. The phase shifter 16A provides a phase shift to the luminance signal Y in response to the phase difference detected by the combination circuit 12. Specifically, the provided phase shift is proportional to the phase difference detected by the combination circuit 12, and the maximum of the provided phase shift corresponds to a ⅓ clock period (one third of the clock period). The phase shifter 16A serves to cancel jitter components in the luminance signal Y.

The output signal from the phase shifter 16A is applied to the composite filter 14. The output signal from the composite filter 14 is applied to the memory 15. The composite filter 14, the memory 15, and the write enable signal generator 17 cooperate to periodically thin out the luminance signal and to compress the luminance signal to ¾. The memory 15 outputs the ¾-compressed luminance signal.

Figure 14:
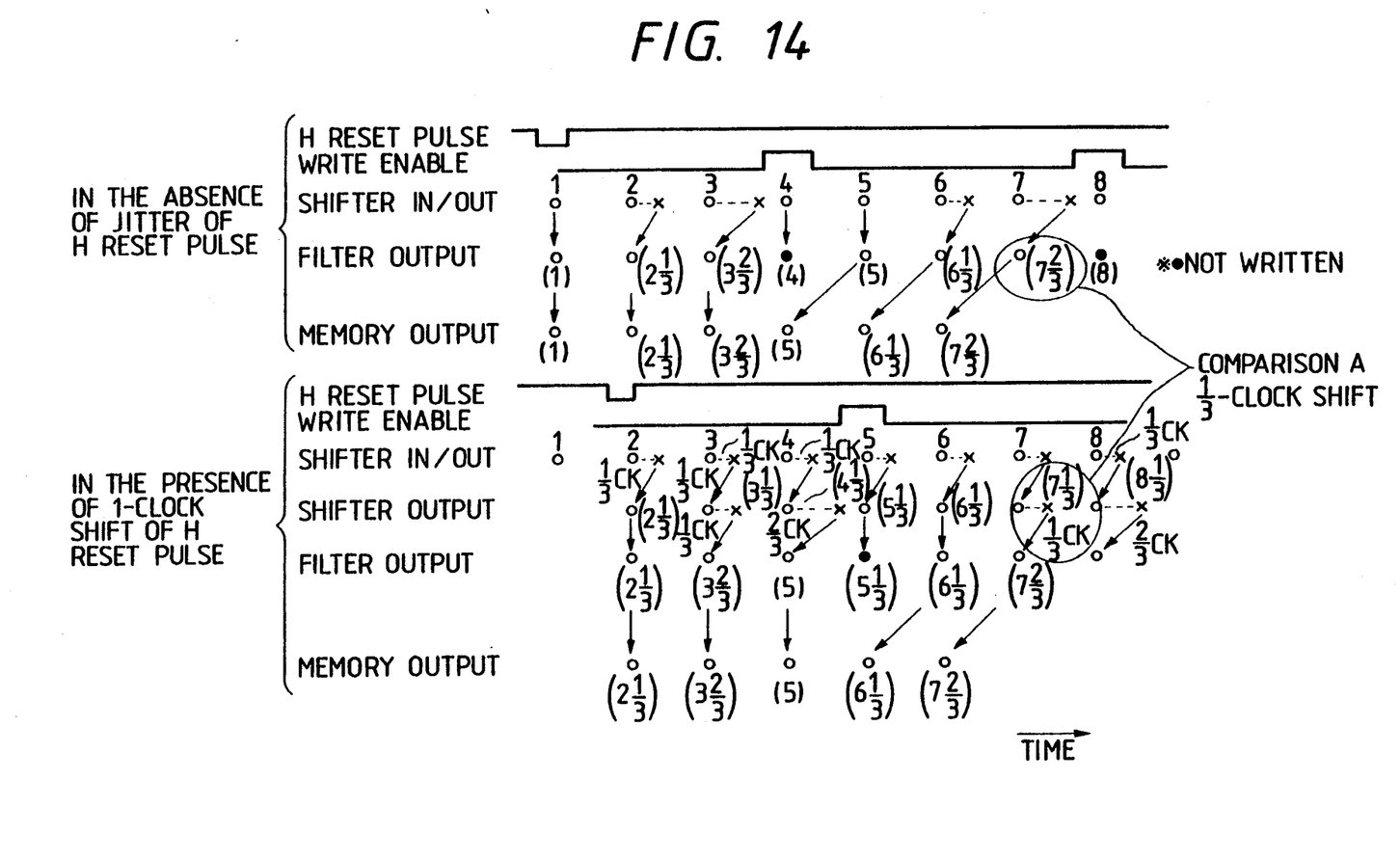
FIG. 14 is a time-domain diagram showing the relation among the phases of various signals in the ¾ compression circuit of FIG. 13.

It is now assumed that, during the processing of a nonstandard video signal, the horizontal reset pulse signal shifts by a period corresponding to one clock pulse as shown in FIG. 14. In this case, the phase of the luminance signal Y outputted from the composite video signal decoder 13 shifts by a period corresponding to one third of the clock period. The ⅓-clock phase shift is understood from the comparison A between the data in FIG. 14. In view of the ⅓-clock phase shift, the phase shifter 16A is designed so as to provide a phase shift corresponding to a period up to one third of the clock period.

What is claimed is:

1. A jitter correction circuit comprising:
   first means for detecting a phase difference between a horizontal sync signal in a video signal and a system clock signal locked to burst components of the video signal;
   second means for subjecting a first luminance signal in the video signal to phase interpolation to convert the first luminance signal to a second luminance signal;
   a memory;
   third means for selectively storing the second luminance signal into the memory to compress the second luminance signal; and
   fourth means for shifting a compressed luminance signal outputted from the memory by a period which is responsive to the phase difference detected by the first means and which is equal to or shorter than one fourth of a 1-clock period of the system clock signal.

2. A jitter correction circuit comprising:
   first means for detecting a phase difference between a horizontal sync signal in a video signal and a first system clock signal locked to burst components of the video signal, the first system clock signal having a frequency equal to four times a chrominance subcarrier frequency of the video signal;
   second means for subjecting a first luminance signal in the video signal to phase interpolation in response to a second system clock signal to convert the first luminance signal to a second luminance signal, the second system clock signal having a frequency equal to eight times the chrominance subcarrier frequency of the video signal;
   a memory;
   third means for selectively storing the second luminance signal into the memory in response to the second system clock signal to compress the second luminance signal; and
   fourth means for shifting a compressed luminance signal outputted from the memory by a period which is responsive to the phase difference detected by the first means and which is equal to or shorter than two fourths of a 1-clock period of the second system clock signal.

3. A jitter correction circuit comprising:
   first means for detecting a phase difference between a horizontal sync signal in a video signal and a first system clock signal locked to burst components of the video signal, and for generating data which represents the detected phase difference and which has an LSB to an MSB, the first system clock signal having a frequency equal to four times a chrominance subcarrier frequency of the video signal;
   second means for generating a horizontal reset pulse signal in response to the horizontal sync signal;

third means synchronized with the horizontal reset pulse signal for subjecting a first luminance signal in the video signal to phase interpolation in response to a second system clock signal to convert the first luminance signal to a second luminance signal, the second system clock signal having a frequency equal to eight times the chrominance subcarrier frequency of the video signal;

a memory;

fourth means synchronized with the horizontal reset pulse signal for selectively storing the second luminance signal into the memory in response to the second system clock signal to compress the second luminance signal;

a 1-clock delay element for shifting a timing of the horizontal reset pulse signal by a period corresponding to a 1-clock period of the second system clock signal when the MSB of the phase difference data is "1"; and fifth means for shifting a compressed luminance signal outputted from the memory by a period which is responsive to the LSB to an MSB-1 of the phase difference data and which is equal to or shorter than one fourth of the 1-clock period of the second system clock signal.

4. A jitter correction circuit comprising:

first means for detecting a phase difference between a horizontal sync signal in a video signal and a system clock signal locked to burst components of the video signal;

second means for subjecting a first luminance signal in the video signal to phase interpolation to convert the first luminance signal to a second luminance signal;

third means for shifting the second luminance signal by a period which is responsive to the phase difference detected by the first means and which is equal to or shorter than one fourth of a 1-clock period of the system clock signal;

a memory; and fourth means for selectively storing an output signal from the third means into the memory to compress the output signal from the third means.

5. A jitter correction circuit comprising:

first means for detecting a phase difference between a horizontal sync signal in a video signal and a system clock signal locked to burst components of the video signal;

second means for shifting a first luminance signal in the video signal by a period which is responsive to the phase difference detected by the first means and which is equal to or shorter than one third of a 1-clock period of the system clock signal;

third means for subjecting an output signal from the second means to phase interpolation to convert the output signal from the second means to a second luminance signal;

a memory; and fourth means for selectively storing the second luminance signal into the memory to compress the second luminance signal.

* * * * *